(12) United States Patent
Patel

(10) Patent No.: US 7,769,786 B2
(45) Date of Patent: Aug. 3, 2010

(54) PROPENSITY-TO-CLICK TARGETING AND MODELING

(75) Inventor: Kavel Patel, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 300 days.

(21) Appl. No.: 11/612,788

(22) Filed: Dec. 19, 2006

(65) Prior Publication Data

US 2008/0147476 A1    Jun. 19, 2008

(51) Int. Cl.
*G06F 17/30* (2006.01)
(52) U.S. Cl. .................. 707/803; 707/603; 707/608; 707/706; 707/736; 707/791
(58) Field of Classification Search .......... 707/600–831
See application file for complete search history.

(56) References Cited

U.S. PATENT DOCUMENTS

| | | | |
|---|---|---|---|
| 5,948,061 A * | 9/1999 | Merriman et al. ........... 709/219 |
| 5,966,695 A | 10/1999 | Melchione et al. | |
| 6,334,110 B1 | 12/2001 | Walter et al. | |
| 2002/0152121 A1 | 10/2002 | Hiroshi | |
| 2003/0097295 A1 | 5/2003 | Kiefer | |
| 2004/0019518 A1 | 1/2004 | Abraham et al. | |
| 2005/0108383 A1* | 5/2005 | DeHaas et al. ............. 709/224 |
| 2005/0187818 A1 | 8/2005 | Zito et al. | |
| 2006/0135234 A1 | 6/2006 | Godse et al. | |
| 2006/0235965 A1 | 10/2006 | Bennett et al. | |
| 2007/0027753 A1* | 2/2007 | Collins ....................... 705/14 |
| 2008/0249854 A1 | 10/2008 | Patel et al. | |

OTHER PUBLICATIONS

International Search Report from PCT/US2007/087793 Dated May 14, 2008.
Written Opinion from PCT/US2007/087793 Dated May 14, 2008.
Google AdSense "What's AdSense?", www.google.com/services/adsense_tour/index.html., copyright 2004.
Non-Final Office Action dated Jul. 8, 2009, from related U.S. Appl. No. 11/697,452.
Final Office Action dated Oct. 29, 2009, from related U.S. Appl. No. 11/697,452.
Pagendarm et al., "Why Are User's Banner-Blind? The Impact of Navigation Style on the Perception of Web Banners," Journal of Digital Information, vol. 2, Issue 1, Article No. 47, Aug. 24, 2001 from http://jodi.tamu.edu/Articles/v02/i01/Pagendarm/.

* cited by examiner

*Primary Examiner*—Isaac M Woo
(74) *Attorney, Agent, or Firm*—Weaver Austin Villeneuve & Sampson LLP

(57) ABSTRACT

In an embodiment of the present invention, two or more metrics may be measured from the group consisting of: the user's age, the user's gender, the user's race, the user's geographic location, the user's annual income, the user's profession, types of areas of the search engine that the user frequents, types of searches that the user typically conducts, and the user's prior history (short and/or long-term) of clicking on advertisements. A propensity-to-click score may then be calculated for the user based on the two or more measured metrics. Then this score may be used to dynamically determine how to present advertising in response to a search by the user.

18 Claims, 4 Drawing Sheets

PROPENSITY-TO-CLICK TARGETING AND MODELING

BACKGROUND OF THE INVENTION

1. Field of the Invention

The present invention relates to the field of Internet searching. More specifically, the present invention relates to the targeting and modeling of a user's propensity-to-click on advertising.

2. Description of the Related Art

When searching for results in an Internet search engine or directory, it is common for advertisements to be displayed on the web page displaying the results of the search. FIG. 1 is a screen capture illustrating a search for the terms "iPod," "nano", "white," and "buy." As can be seen, ads 100 may be displayed above the search results 102. The ads 100 displayed above search results are often called "North" ads. Ads 104 may also be displayed below the search results 102. These ads 104 are often called "South" ads. "East" ads 106 may be displayed to the right of the search results 102. Search results 102 are sometimes called "natural" results.

The advertisements may take the form of sponsored search results, wherein sponsors pay to have particular search term combinations return a results page in which the sponsor's links are also displayed (along with, perhaps, a short description of the link). Sponsors often pay for such advertising on a per-click basis, wherein the total advertising charge is based on the number of times users click on the sponsored link.

Advertisers generally purchase ads for specific searches based on the popularity of the search terms (i.e., the number of times users search for those search terms). However, this can be an unreliable measure of how likely the user is to turn into a paying customer of the advertiser.

SUMMARY OF THE INVENTION

In an embodiment of the present invention, two or more metrics may be measured from the group consisting of: the user's age, the user's gender, the user's race, the user's geographic location, the user's annual income, the user's profession, types of areas of the search engine that the user frequents, types of searches that the user typically conducts, and the user's prior history (short and/or long term) of clicking on advertisements. A propensity-to-click score may then be calculated for the user based on the two or more measured metrics. Then this score may be used to dynamically determine how to present advertising in response to a search by the user.

DETAILED DESCRIPTION OF SPECIFIC EMBODIMENTS

Figure 1:
FIG. 1 is a screen capture illustrating a search for the terms "iPod" and "white."

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

During the inventive process surrounding the present invention, a significant amount of research was conducted to measure the usage patterns of users performing searchers. In this research, it was unexpectedly discovered that user profiles can often be a more reliable indicator of the ultimate monetization of a search term than the search term itself. For example, it was found that older users are more likely to click on advertisements, and more likely to purchase based on those advertisements, than younger users. It was also found that frequent users were more likely to click on advertisements and more likely to purchase based on those advertisements, than infrequent users. This realization resulted in approaching the problem from a completely new perspective—i.e., from the user perspective, and how likely it is for users to eventually reward the advertiser's choice to advertise by making some purchase.

In an embodiment of the present invention, the user's propensity to click on advertising may be quantified into a score. This score may be based on a number of factors from a user model, which will be described later. This score may then be utilized at search time (or any other user web page visit) to determine which ads, and how many ads, to display to the user.

The dynamic adjustment of the number of ads displayed allows, for example, the system to take a user with a low propensity to click on advertisements and choose to display zero advertisements on results pages. This allows the system to slowly "retrain" the user, who may have learned over time to ignore advertisements. After several months of getting results pages with no advertisements, the user may then be more likely to begin to click on advertisements once they are started up again.

The score may also be used to optimize marketing efforts and advertising inventory through the targeting of high scoring individuals. For example, an advertiser may be asked to pay more for advertisements for high scoring individuals. Efforts may also be undertaken to convert low-scoring individuals into users who are more likely to click on advertising. This may include the aforementioned dynamic adjustment of ads displayed but may also include other techniques, such as limiting display to popular advertisements in the user's geographic area, or by performing more detailed analysis of the user to determine the best way to monetize the user's searches (e.g., sending the user a questionnaire or targeted e-mails).

Additionally, non-searching users with higher scores may be targeted via a user acquisition targeting campaign because they will better monetize on their search.

Figure 2:
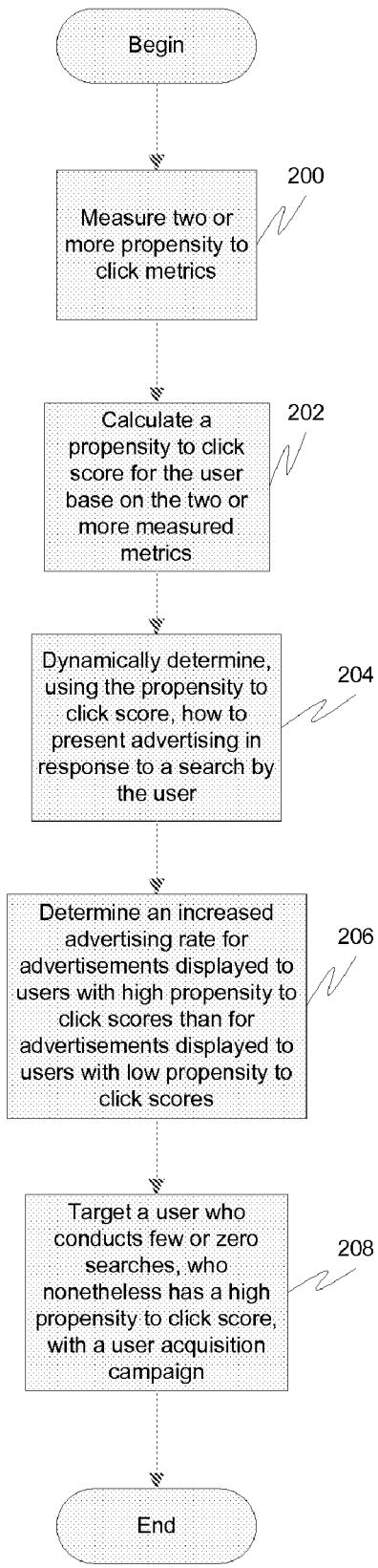
FIG. 2 is a flow diagram illustrating a method for utilizing the propensity of a search engine user on advertisements in accordance with an embodiment of the present invention.

Any of a number of metrics may be combined in a variety of ways to arrive at a user's propensity-to-click score. These metrics may include, for example:

1. The user's age
2. The user's gender
3. The user's frequency of searches
4. The user's race
5. The user's geographic location
6. The user's annual income
7. The user's profession
8. The types of other areas of the search engine/directory that the user frequents (e.g., finance, sports, entertainment)
9. The types of searches that the user typically conducts
10. The user's prior history (short and/or long-term) of clicking on advertisements FIG. 2 is a flow diagram illustrating a method for utilizing the propensity of a search engine user on advertisements in accordance with an embodiment of the present invention. At 200, two or more propensity-to-click metrics may be measured. The propensity-to-click metrics may be selected from the group consisting of: the user's age, the user's gender, the user's race, the user's geographic location, the user's annual income, the user's profession, types of areas of the search engine that the user frequents, types of searches that the user typically conducts, and the user's prior history of clicking on advertisements. It should be noted that this list is not exhaustive and the metrics may be selected from any metrics related to the user's propensity to click on advertising. At 202, a propensity-to-click score may be calculated for the user based on the two or more measured metrics.

At 204, the propensity-to-click score for the user may be used to dynamically determine how to present advertising in response to a search by the user. This may include determining to present zero advertisements in response to a search by a user with a low propensity-to-click score. This may also include, if the user has been presented with zero advertisements over a preset period (e.g., 3 months) due to a low propensity-to-click score, determining to present one or more advertisements in response to a search by the user. This may also include determining to present only advertisements popular in the user's geographic area in response to a search by a user with a low propensity-to-click score.

At 206, an increased advertising rate may be determined for advertisements displayed to users with high propensity-to-click scores than for advertisements displayed to users with low propensity-to-click scores. At 208, a user who conducts few (e.g., less than 1 per month) or zero searches, who nonetheless has a high propensity-to-click score, may be targeted with a user acquisition campaign.

Figure 3:
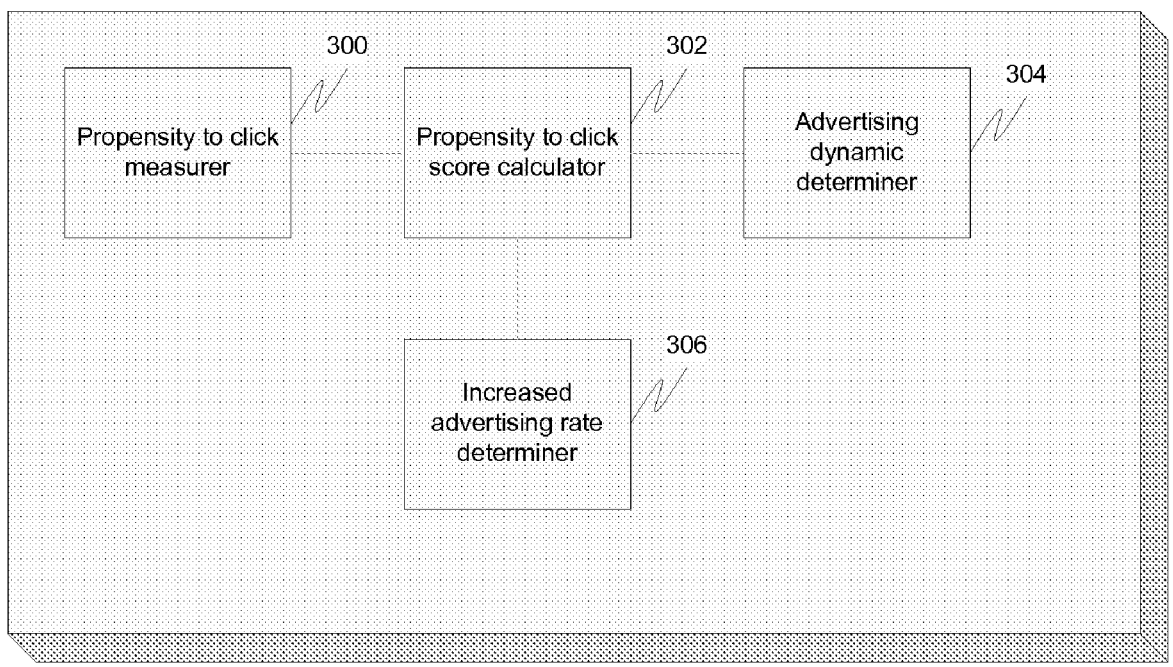
FIG. 3 is a block diagram illustrating an apparatus for utilizing a user of a search engine's propensity to click on advertisements in accordance with an embodiment of the present invention.

FIG. 3 is a block diagram illustrating an apparatus for utilizing a user of a search engine's propensity to click on advertisements in accordance with an embodiment of the present invention. A propensity-to-click measurer 300 may be configured to measure two or more propensity-to-click metrics. The propensity-to-click metrics may be selected from the group consisting of: the user's age, the user's gender, the user's race, the user's geographic location, the user's annual income, the user's profession, types of areas of the search engine that the user frequents, types of searches that the user typically conducts, and the user's prior history of clicking on advertisements. A propensity-to-click score calculator 302 coupled to the propensity-to-click measurer 300 may be configured to calculate a propensity-to-click score for the user based on the two or more measured metrics.

An advertising dynamic determiner 304 coupled to the propensity-to-click score calculator 302 may be configured to dynamically determine, using the propensity-to-click score for the user, how to present advertising in response to a search by the user. This may include determining to present zero advertisements in response to a search by a user with a low propensity-to-click score. This may also include, if the user has been presented with zero advertisements over a preset period (e.g., 3 months) due to a low propensity-to-click score, determining to present one or more advertisements in response to a search by the user. This may also include determining to present only advertisements popular in the user's geographic area in response to a search by a user with a low propensity-to-click score.

An increased advertising rate determiner 306 coupled to the propensity-to-click score calculator 304 may be configured to determine an increased advertising rate for advertisements displayed to users with high propensity-to-click scores than for advertisements displayed to users with low propensity-to-click scores.

Figure 4:
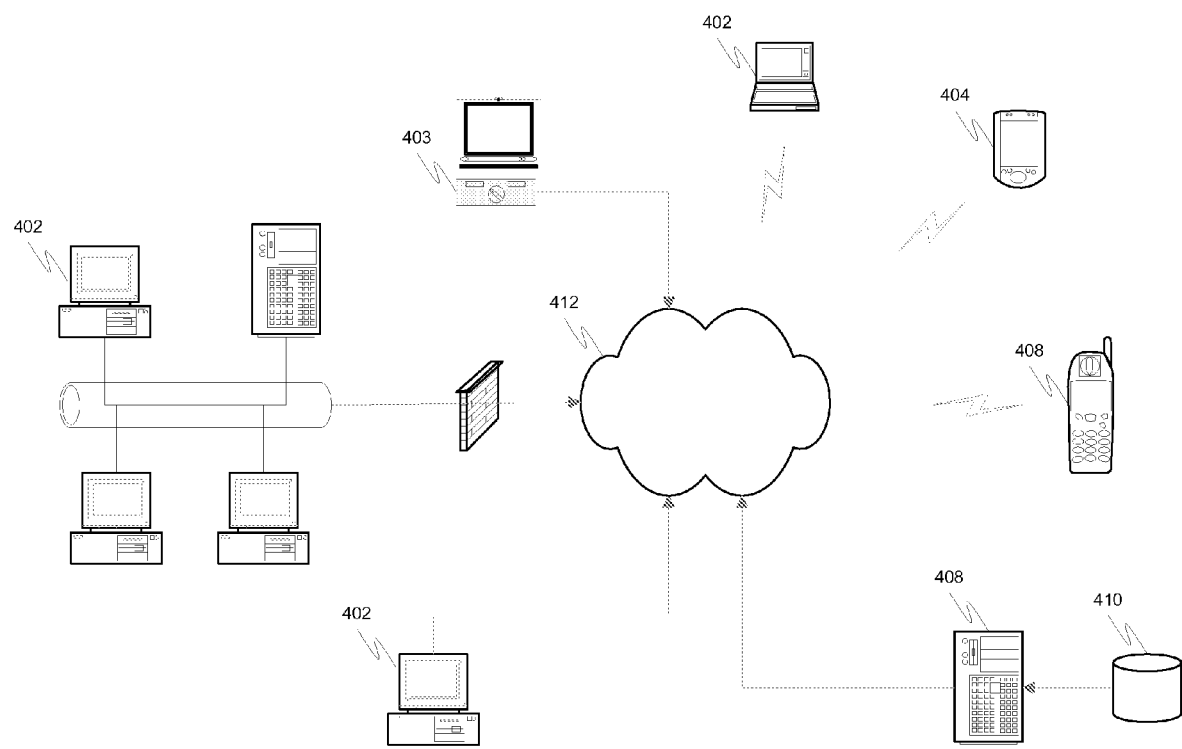
FIG. 4 is an exemplary network diagram illustrating some of the platforms which may be employed with various embodiments of the invention.

It should also be noted that the present invention may be implemented on any computing platform and in any network topology in which search categorization is a useful functionality. For example and as illustrated in FIG. 4, implementations are contemplated in which the propensity-to-click score calculator described herein is employed in a network containing personal computers 402, media computing platforms 403 (e.g., cable and satellite set top boxes with navigation and recording capabilities (e.g., Tivo)), handheld computing devices (e.g., PDAs) 404, cell phones 406, or any other type of portable communication platform. Users of these devices may conduct searches, which are then transmitted to server 408. Server 408 may then utilize the propensity-to-click score in determining various different activities to take with respect to the user. As discussed above, applications may be resident on such devices, e.g., as part of a browser or other application, or be served up from a remote site, e.g., in a Web page, (represented by server 408 and data store 410). The invention may also be practiced in a wide variety of network environments (represented by network 412), e.g., TCP/IP-based networks, telecommunications networks, wireless networks, etc.

While the invention has been particularly shown and described with reference to specific embodiments thereof, it will be understood by those skilled in the art that changes in the form and details of the disclosed embodiments may be made without departing from the spirit or scope of the invention. For example, it will be understood that the various propensity-to-click metrics referred to herein are merely examples of metrics which may be employed with embodiments of the invention, and that embodiments are contemplated in which a wide variety of metrics may be employed in various combinations. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for utilizing a user of a search engine's propensity-to-click on advertisements, the method comprising:

measuring two or more metrics relating to the user's propensity to click on advertising;

calculating a propensity-to-click score for the user based on the two or more measured metrics, wherein the propensity-to-click score for the user indicates the user's propensity to click on advertising; and dynamically determining, using the propensity-to-click score for the user, how to display advertising to the user on a results web page presented in response to a search by the user, wherein the dynamically determining includes determining to display zero advertisements on the results web page presented in response to the search when the user has a low propensity-to-click score.

2. The method of claim 1, wherein the two or more metrics are selected from the group consisting of:
the user's age;
the user's gender;
the user's race;
the user's geographic location;
the user's annual income;
the user's profession;
types of areas of the search engine that the user frequents;
types of searches that the user typically conducts; and
the user's prior history of clicking on advertisements.

3. The method of claim 1, wherein the dynamically determining includes, if the user has been presented with zero advertisements over a preset period due to a low propensity-to-click score, determining to present one or more advertisements in response to a search by the user.

4. The method of claim 3, wherein the preset period is three months.

5. The method of claim 1, further comprising:
determining an increased advertising rate for advertisements displayed to users with high propensity-to-click scores than for advertisements displayed to users with low propensity-to-click scores.

6. The method of claim 1, wherein the dynamically determining includes determining to present only advertisements popular in the user's geographic area in response to a search by a user with a low propensity-to-click score.

7. The method of claim 1, further comprising, if the user's propensity-to-click score is high but the user does not conduct many searches, targeting the user with a user acquisition campaign.

8. A hardware apparatus for utilizing a user of a search engine's propensity-to-click on advertisements, the apparatus comprising:
a propensity-to-click metric measurer configured to measure two or more metrics relating to the user's propensity to click on advertising;
a propensity-to-click score calculator coupled to the propensity-to-click metric measurer and configured to calculate a propensity-to-click score for the user based on the two or more measured metrics, wherein the propensity-to-click score for the user indicates the user's propensity to click on advertising; and
an advertising dynamic determiner coupled to the propensity-to-click score calculator and configured to dynamically determine, using the propensity-to-click score for the user, how to display advertising to the user on a results web page presented in response to a search by the user, wherein the dynamically determining includes determining to display zero advertisements on the results web page presented in response to the search when the user has a low propensity-to-click score.

9. The hardware apparatus of claim 8, wherein the propensity-to-click metric measurer is further configured measure two or more metrics elected from the group consisting of:
the user's age;
the user's gender;
the user's race;
the user's geographic location;
the user's annual income;
the user's profession;
types of areas of the search engine that the user frequents;
types of searches that the user typically conducts; and
the user's prior history of clicking on advertisements.

10. The hardware apparatus of claim 8, further comprising:
an increased advertising rate determiner coupled to the propensity-to-click score calculator and configured to determine an increased advertising rate for advertisements displayed to users with high propensity-to-click scores than for advertisements displayed to users with low propensity-to-click scores.

11. A hardware apparatus for utilizing a user of a search engine's propensity-to-click on advertisements, the apparatus comprising:
means for measuring two or more metrics relating to the user's propensity to click on advertising;
means for calculating a propensity-to-click score for the user based on the two or more measured metrics, wherein the propensity-to-click score for the user indicates the user's propensity to click on advertising; and
means for dynamically determining, using the propensity-to-click score for the user, how to display advertising to the user on a results web page presented in response to a search by the user, wherein the dynamically determining includes determining to display zero advertisements on the results web page presented in response to the search when the user has a low propensity-to-click score.

12. A program storage device readable by a machine, tangibly embodying a program of instructions executable by the machine to perform a method for utilizing a user of a search engine's propensity-to-click on advertisements, the method comprising:
measuring two or more metrics relating to the user's propensity to click on advertising;
calculating a propensity-to-click score for the user based on the two or more measured metrics, wherein the propensity-to-click score for the user indicates the user's propensity to click on advertising; and
dynamically determining, using the propensity-to-click score for the user, how to display advertising to the user on a results web page presented in response to a search by the user, wherein the dynamically determining includes determining to display zero advertisements on the results web page presented in response to the search when the user has a low propensity-to-click score.

13. The program storage device of claim 12, wherein the two or more metrics are selected from the group consisting of:
the user's age;
the user's gender;
the user's race;
the user's geographic location;
the user's annual income;
the user's profession;
types of areas of the search engine that the user frequents;
types of searches that the user typically conducts; and
the user's prior history of clicking on advertisements.

14. The program storage device of claim 12, wherein the dynamically determining includes, if the user has been presented with zero advertisements over a preset period due to a low propensity-to-click score, determining to present one or more advertisements in response to a search by the user.

15. The program storage device of claim 14, wherein the preset period is three months.

16. The program storage device of claim 12, wherein the method further comprises:
determining an increased advertising rate for advertisements displayed to users with high propensity-to-click scores than for advertisements displayed to users with low propensity-to-click scores.

17. The program storage device of claim 12, wherein the dynamically determining includes determining to present only advertisements popular in the user's geographic area in response to a search by a user with a low propensity-to-click score.

18. The program storage device of claim 12, wherein the method further comprises, if the user's propensity-to-click score is high but the user does not conduct many searches, targeting the user with a user acquisition campaign.

* * * * *